(12) United States Patent
Zhao et al.

(10) Patent No.: US 10,174,879 B2
(45) Date of Patent: Jan. 8, 2019

(54) CLAMPING MECHANISM AND GIMBAL HAVING THE CLAMPING MECHANISM

(71) Applicant: SZ DJI TECHNOLOGY CO., LTD., Shenzhen (CN)

(72) Inventors: Xifeng Zhao, Shenzhen (CN); Guoyao Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/893,181

(22) Filed: Feb. 9, 2018

(65) Prior Publication Data

US 2018/0163920 A1 Jun. 14, 2018

Related U.S. Application Data

(63) Continuation of application No. PCT/CN2015/086541, filed on Aug. 10, 2015.

(51) Int. Cl.

| F16M 13/04 | (2006.01) |
|---|---|
| F16M 11/04 | (2006.01) |
| G03B 17/56 | (2006.01) |
| B25J 1/00 | (2006.01) |
| B25J 15/00 | (2006.01) |

(Continued)

(52) U.S. Cl.
CPC .............. *F16M 13/04* (2013.01); *B25J 1/00* (2013.01); *B25J 15/0028* (2013.01); *F16M 11/04* (2013.01); *F16M 11/10* (2013.01); *F16M 11/2014* (2013.01); *F16M 11/2028* (2013.01); *G03B 17/56* (2013.01); *G03B 17/561* (2013.01);

(Continued)

(58) Field of Classification Search
None
See application file for complete search history.

(56) References Cited

U.S. PATENT DOCUMENTS

| 3,788,585 A * | 1/1974 | Masseron | F16M 11/04 |
|---|---|---|---|
| | | | 248/178.1 |
| 4,341,452 A * | 7/1982 | Korling | F16M 11/105 |
| | | | 248/179.1 |

(Continued)

FOREIGN PATENT DOCUMENTS

| CN | 2196227 Y | 5/1995 |
|---|---|---|
| CN | 201097080 Y | 8/2008 |

(Continued)

OTHER PUBLICATIONS

The World Intellectual Property Organization (WIPO) International Search Report for PCT/CN2015/086541 dated May 18, 2016 8 Pages.

*Primary Examiner* — William B Perkey
(74) *Attorney, Agent, or Firm* — Anova Law Group, PLLC

(57) ABSTRACT

A gimbal includes a main body and a clamping mechanism rotatably connected to the main body. The clamping mechanism includes an adaptor connecting the clamping mechanism to the main body. The adaptor includes a connecting member connecting the adaptor to the main body. The clamping mechanism further includes a holding portion rotatably connected to the adaptor and one or more damping members disposed between the holding portion and the adaptor. The one or more damping members are configured to provide a resistance to a rotation of the holding portion with respect to the adaptor.

20 Claims, 10 Drawing Sheets

(51) Int. Cl.
*F16M 11/10* (2006.01)
*F16M 11/20* (2006.01)
*H04M 1/02* (2006.01)

(52) U.S. Cl.
CPC ......... *H04M 1/0264* (2013.01); *G03B 17/563* (2013.01)

(56) References Cited

U.S. PATENT DOCUMENTS

| | | | |
|---|---|---|---|
| 4,767,090 | A | 8/1988 | Hartman et al. |
| 8,770,866 | B2 | 7/2014 | Chapman |
| 8,998,512 | B1 * | 4/2015 | Celler ................. G03B 17/561 396/427 |
| 9,377,157 | B1 * | 6/2016 | Kilgore .............. F16M 11/2064 |
| 2014/0158845 | A1 | 6/2014 | Fliger et al. |
| 2016/0131963 | A1 * | 5/2016 | Clearman ............ G03B 17/561 224/267 |
| 2017/0114954 | A1 * | 4/2017 | Zhao ...................... F16M 11/06 |
| 2017/0174362 | A1 * | 6/2017 | Zhao ................... F16M 11/041 |
| 2017/0227834 | A1 * | 8/2017 | Zhao ................... F16M 11/045 |
| 2018/0013934 | A1 * | 1/2018 | Germe ................ G03B 17/561 |
| 2018/0163920 | A1 * | 6/2018 | Zhao ...................... F16M 11/04 |

FOREIGN PATENT DOCUMENTS

| | | |
|---|---|---|
| CN | 201202939 Y | 3/2009 |
| CN | 201311539 Y | 9/2009 |
| CN | 201378242 Y | 1/2010 |
| CN | 102156377 A | 8/2011 |
| CN | 204188938 U | 3/2015 |
| CN | 204964966 U | 1/2016 |
| CN | 205048087 U | 2/2016 |

* cited by examiner

CLAMPING MECHANISM AND GIMBAL HAVING THE CLAMPING MECHANISM

CROSS-REFERENCE TO RELATED APPLICATION

This application is a continuation application of International Application No. PCT/CN2015/086541 filed Aug. 10, 2015, the entire contents of which are incorporated herein by reference.

TECHNICAL FIELD

The disclosure relates to a photographic equipment, and particularly to a clamping mechanism and a gimbal having the clamping mechanism.

BACKGROUND OF THE DISCLOSURE

Prior art phone holders can hold a phone device by clamping opposite sides of the phone. However, the phone device is likely to release from the phone holder due to a shock. Some phone holders can hold the phone device by clamping four sides of the phone. However, a user has to manipulate an object, to which the phone holder is attached, to adjust an attitude of the phone. The manipulation of prior art phone holder is inconvenient.

SUMMARY OF THE DISCLOSURE

There is a need for a clamping mechanism capable of easily adjusting an attitude and a gimbal having the clamping mechanism.

An aspect of the disclosure provides a clamping mechanism comprising a holding portion and an adaptor connected to the holding portion, the adaptor connecting the clamping mechanism to a bearing member. The holding portion can be rotatably connected to the adaptor to adjust an attitude relative to the adaptor. The clamping mechanism can further comprise a damping member disposed between the holding portion and the adaptor. The damping member can provide a rotational resistance when the holding portion rotates with respect to the adaptor, such that the holding portion can be retained at an attitude relative to the adaptor by the rotational resistance when an external force rotating the holding portion is removed. The adaptor can comprise a connecting member through which the adaptor can be connected to the bearing member.

In some embodiments, the holding portion can comprise a first clamping member and a second clamping member rotatably connected to the first clamping member, the second clamping member being connected to the adaptor.

In some embodiments, the first clamping member can comprise a bottom casing, a pivoting portion connected to the bottom casing and a guiding member connected to the bottom casing and the pivoting portion. The guiding member can guide a relative movement of the bottom casing with respect to the pivoting portion.

In some embodiments, the first clamping member can comprise a tension spring. The guiding member can be provided with a guiding slot. One end of the tension spring can be connected to the bottom casing, and the other end of the tension spring can pass through the guiding slot and be connected to the pivoting portion.

In some embodiments, the first clamping member further comprise a base plate and a clamp. The base plate can be fixed to the bottom casing. The clamp can be rotatably connected to the base plate for clamping an object.

In some embodiments, the clamps can be made of an elastic material.

In some embodiments, the first clamping member can further comprise an arm. One end of the arm can be rotatably connected to the clamps, and the other end of the arm can be rotatably connected to the base plate.

In some embodiments, the base plate can be provided with a first receiving slot. The arm and a portion of the clamp can be received in the first receiving slot upon a relative rotation of the arm and the clamp with respect to the base plate.

In some embodiments, the clamp can be provided with a holding slot for partially receiving a corner of the object when the object is clamped by the clamp, such that the object can be prevented from releasing from the clamping mechanism due to a shock.

In some embodiments, two arms and two clamps can be provided.

In some embodiments, the arm can be a telescopic rod.

In some embodiments, the clamping mechanism can further comprise a bearing plate fixed to the base plate and a first elastic member, the first elastic member being disposed on the bearing plate to provide an elastic contact between the object and the bearing plate.

In some embodiments, the first elastic member can protrude from the bearing plate.

In some embodiments, the guiding member can be provided with a restrainer. The base plate can be provided with a stopper. The restrainer can abut against the stopper to restrain a movement of the guiding member.

In some embodiments, the second clamping member can comprise a connecting body. The adaptor can comprise a chuck fixed to a bearing body. The connecting member can pass through the damping member, the connecting body and the chuck. The chuck can be connected to the bearing member.

In some embodiments, two damping members can be provided. One of the damping members can be disposed between the connecting body and the bearing body and abut against one side of the connecting body and the bearing body. The other one of the damping members can abut against the other side of the connecting body.

In some embodiments, the chuck can comprise a tightening portion, the tightening portion being connected to the bearing member.

In some embodiments, the tightening portion can comprise a plurality of teeth arranged on one end face of the chuck along a circumference of the chuck.

In some embodiments, the second clamping member can further comprise a connecting portion fixed to the connecting body. The second clamping member can further comprise a second elastic member disposed on the connecting portion and the connecting body for clamping the object.

In some embodiments, the connecting portion can be provided with a receiving portion in which the connecting member can be partially received.

In some embodiments, the adaptor can further comprise a retaining ring and a nut. The connecting member can pass through the nut and the retaining ring. The retaining ring can be located between the nut and the first connecting body for preventing the nut from loosening.

In some embodiments, the bearing body can comprise a body and a plain shaft connected to the body, the plain shaft passing through the damping members, the connecting body, the retaining ring and the nut in this order. The retaining ring can be provided with a ring hole, the plain shaft can comprise a fitting surface, and the fitting surface mates with the ring hole to restrain a rotation of the retaining ring about the plain shaft.

In some embodiments, the connecting member can comprise a threaded shaft, the threaded shaft passing through the plain shaft and the body and being partially received in the chuck.

In some embodiments, the ring hole can be a non-circular hole.

Another aspect of the disclosure provides a gimbal comprising a main body. The gimbal can further comprise the aforementioned clamping mechanism. The main body can be a bearing member, and the clamping mechanism can be rotatably connected to the main body.

In some embodiments, in changing an attitude of an object clamped by the clamping mechanism, a rotatable state of the clamping mechanism can be effected by overcoming the rotational resistance provided by the damping member to the holding portion when the holding portion rotates with respect to the adaptor, such that the clamping mechanism can be rotated to the desired attitude with respect to the main body. Two damping members can be provided.

In some embodiments, a locked state of the clamping mechanism can be effected when the object clamped by the clamping mechanism is rotated to the desired attitude and an external force rotating the holding portion is removed. The holding portion can be retained at the desired attitude with respect to the adaptor when the clamping mechanism is in the locked state.

Another aspect of the disclosure provides a clamping mechanism comprising a base plate, an arm rotatably connected to the base plate and a clamp connected to the arm. The base plate can be provided with a first receiving slot. The clamp can be received in the first receiving slot upon a rotation of the arm with respect to the base plate when the clamping mechanism is not in use.

In some embodiments, the arm can be a telescopic rod.

In some embodiments, one end of the arm can be rotatably connected to the clamp.

In some embodiments, the clamping mechanism can further comprise a bearing plate fixed to the base plate and a first elastic member, the first elastic member being fixed on the bearing plate to provide an elastic contact between an object and the bearing plate.

In some embodiments, the first elastic member can protrude from the bearing body.

In some embodiments, the clamp can be provided with a holding slot for partially receiving a corner of the object when the object is clamped by the clamp, such that the object can be prevented from releasing from the clamping mechanism due to a shock.

In some embodiments, the gimbal can further comprise an actuator rotatably connected to the main body for carrying an imaging device.

In some embodiments, the gimbal can further comprise a control system provided to the main body, the control system comprising a mode button and rotation button. The mode button can control a mode of the actuator to switch between an operating mode and a non-operating mode. The rotation button can control the actuator to drive the imaging device to rotate a predetermined angle with respect to the main body when the actuator is in the operating mode.

In some embodiments, the predetermined angle can be 660°.

With the clamping mechanism and the gimbal having the clamping mechanism of the disclosure, the holding portion can be rotatably connected to the adaptor to adjust an attitude of the holding portion with respect to the adaptor. In some instances, the clamping mechanism can comprise a damping member provided between the holding portion and the adaptor. The damping member can provide a rotational resistance when the holding portion rotates relative to the adaptor. The holding portion can be retained at a desire attitude with respect to the adaptor by the rotational resistance when an external force rotating the holding portion is removed. An attitude of an object clamped by the clamping mechanism can be varied by simply rotating the clamping mechanism. A manipulation of the clamping mechanism can be made easy.

LIST OF REFERENCE NUMERALS

TABLE 1

Figure 1:
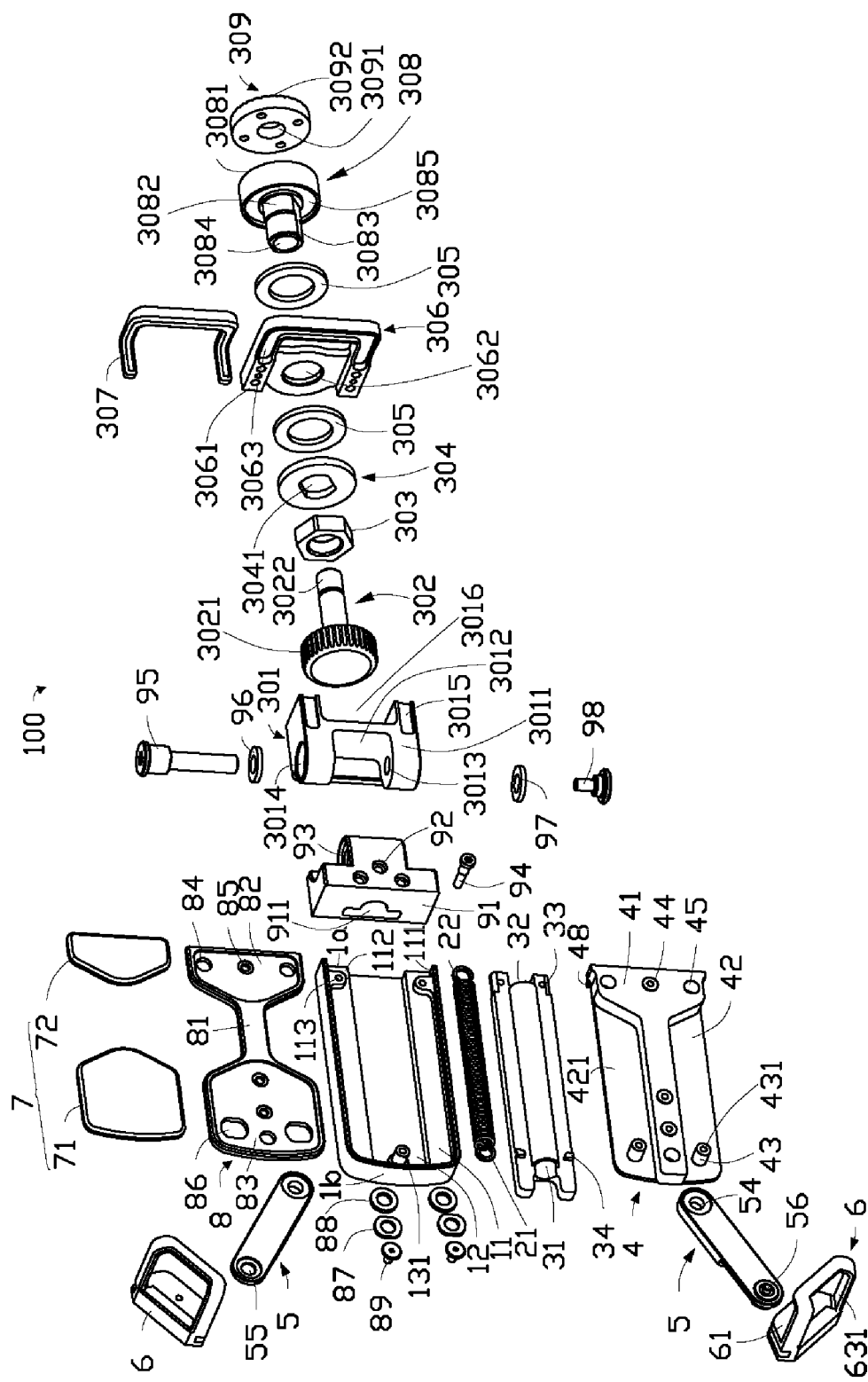
FIG. 1 is an exploded view of a clamping mechanism according to a first embodiment of the disclosure.

| | |
|---|---|
| Clamping mechanism | 100, 300 |
| Holding portion | 10 |
| First clamping member | 10a |
| Second clamping member | 10b |
| Bottom casing | 1 |
| First end | 1a |
| Second end | 1b |
| First groove | 11 |
| First side | 111 |
| Connecting block | 112 |
| First threaded hole | 113 |
| Second groove | 12 |
| First connecting post | 13 |
| Second threaded hole | 131 |
| Tension spring | 2 |
| First connecting end | 21 |
| Second connecting end | 22 |
| Guiding member | 3 |
| Guiding slot | 31 |
| First clearing slot | 32 |
| Third threaded hole | 33 |
| Restrainer | 34 |
| Base plate | 4 |
| First surface | 41 |
| First receiving slot | 42 |
| First bottom surface | 421 |
| Second connecting post | 43 |
| Fourth threaded hole | 431 |
| Fifth threaded hole | 44 |
| First through-hole | 45 |
| First screw | 46 |

TABLE 1-continued

| | |
|---|---|
| Second screw | 47 |
| Stopper | 48 |
| Arm | 5 |
| Second surface | 51 |
| Third surface | 52 |
| Second clearing slot | 53 |
| First stepped hole | 54 |
| First shaft hole | 55 |
| Connecting shaft | 56 |
| Clamp | 6 |
| Carrying stage | 61 |
| Second receiving slot | 62 |
| Clamping plate | 63 |
| Second side | 631 |
| Holding slot | 64 |
| First elastic member | 7 |
| First elastic sheet | 71 |
| Second elastic sheet | 72 |
| Bearing plate | 8 |
| Fourth surface | 81 |
| Third receiving slot | 82 |
| Fourth receiving slot | 83 |
| Second through-hole | 84 |
| Sixth threaded hole | 85 |
| First through-slot | 86 |
| Damping member | 87 |
| First gasket | 88 |
| Third screw | 89 |
| Pivoting portion | 9 |
| Third side | 91 |
| Fifth receiving slot | 911 |
| Second stepped hole | 92 |
| First pin hole | 93 |
| First pin | 94 |
| Second pin | 95 |
| Second gasket | 96 |
| Third gasket | 97 |
| Third pin | 98 |
| Adaptor | 30, 40 |
| Connecting portion | 301 |
| Connecting surface | 3011 |
| Connecting slot | 3012 |
| First connecting hole | 3013 |
| Second connecting hole | 3014 |
| First holding slot | 3015 |
| Receiving portion | 3016 |
| Connecting member | 302 |
| Knob | 3021 |
| Threaded shaft | 3022 |
| Second holding slot | 3023 |
| Nut | 303 |
| Retaining ring | 304 |
| Ring hole | 3041 |
| Damping member | 305 |
| Connecting body | 306 |
| Fixing surface | 3061 |
| Fitting hole | 3062 |
| Third holding slot | 3063 |
| Second elastic member | 307 |
| Bearing body | 308 |
| Body | 3081 |
| Plain shaft | 3082 |
| Fitting surface | 3083 |
| Third through-hole | 3084 |
| Fourth holding slot | 3085 |
| Chuck | 309 |
| Aperture | 3091 |
| Tightening portion | 3092 |
| Elastic body | 401 |
| Snap ring | 402 |
| Abutting member | 403 |
| Receiving hole | 4031 |
| Gimbal | 200, 400 |
| Main body | 201 |
| Engaging portion | 2011 |
| Actuator | 202 |
| Control system | 203 |
| Mode button | 2031 |
| Rotation button | 2032 |

Embodiments of the present disclosure will be described with reference to the drawings.

DETAILED DESCRIPTION OF THE DISCLOSURE

Illustrative embodiments of the disclosure are described with reference to the drawings. The embodiments and features can be combined with one another provided they are technically compatible.

Figure 2:
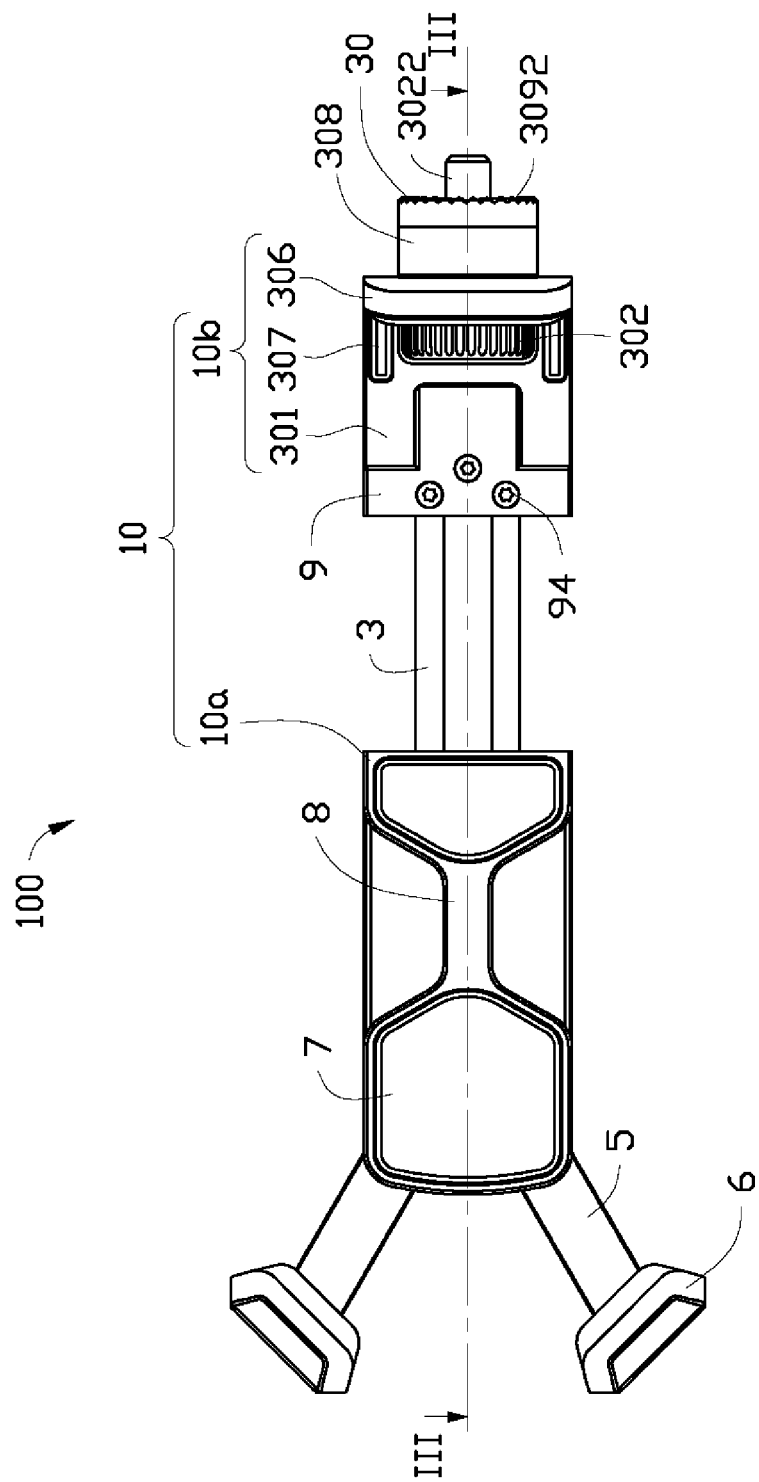
FIG. 2 is a top view of the clamping mechanism of FIG. 1.
Figure 3:
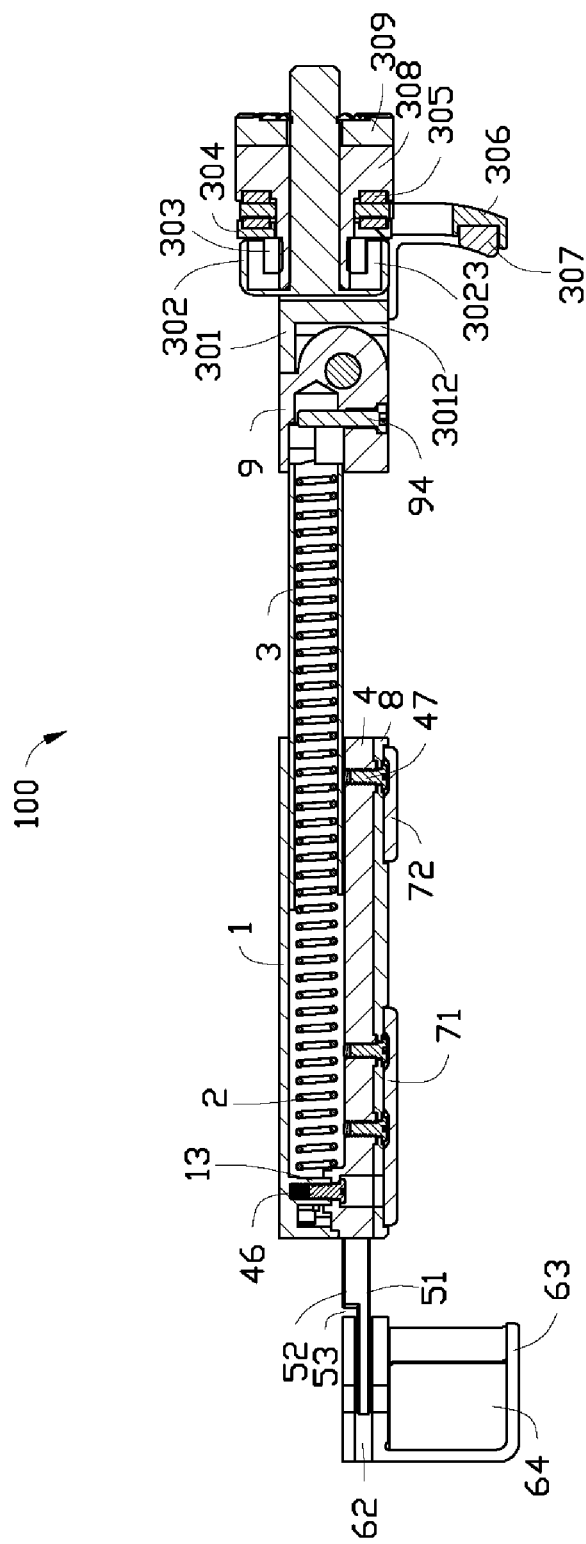
FIG. 3 is a cross-sectional view of the clamping mechanism of FIG. 2, taken along an line.

Referring to FIGS. 1 to 3, a first embodiment of the present disclosure provides a clamping mechanism 100 comprising a holding portion 10, an adaptor 30 connected to the holding portion 10 and a damping member 305 disposed between the holding portion 10 and the adaptor 30.

The holding portion 10 can comprise a first clamping member 10*a* and a second clamping member 10*b* rotatably connected to the first clamping member 10*a*. The first clamping member 10*a* can comprise a bottom casing 1, a tension spring 2, a guiding member 3, a base plate 4, an arm 5, a clamp 6, a first elastic member 7, a bearing plate 8 and a pivoting portion 9.

The bottom casing 1 can comprise a first end 1*a* and a second end 1*b* which is provided opposite to the first end 1*a*. The bottom casing 1 can be provided with a first groove 11. The first groove 11 can comprise two first sides 111 which are provided opposite to each other. In some instances, the bottom casing 1 can comprise a connecting block 112 for connecting with the base plate 4. In some embodiments, two connecting blocks 112 can be provided which are respectively disposed at a first side 111 at a position in proximity to the first end 1*a*. Each of the connecting blocks 112 can be provided with a first threaded hole 113, a central axis of which being substantially parallel to the first side 111. A second groove 12 can be provided at a bottom surface of the first groove 11. The tension spring 2 and the guiding member 3 can be partially received in the first groove 11 and the second groove 12. In some instances, the bottom casing 1 can comprise a first connecting post 13. The first connecting post 13 can be disposed on a bottom surface of the second groove 12 at a position in proximity to the second end 1*b*. The first connecting post 13 can be provided with a second threaded hole 131.

One end of the tension spring 2 can be connected to the first connecting post 13 of the bottom casing 1, and the other end of the tension spring 2 can be connected to the pivoting portion 9. The tension spring 2 can comprise a first connecting end 21 and a second connecting end 22 opposite to the first connecting end 21. The first connecting end 21 can be sleeved on the first connecting post 13, such that the tension spring 2 is connected to the bottom casing 1.

The guiding member 3 can be connected to the bottom casing 1 and the pivoting portion 9 for guiding a relative movement of the bottom casing 1 with respect to the pivoting portion 9. The guiding member 3 can be provided with a guiding slot 31 for partially receiving the tensing spring 2 and guiding a movement of the tension spring 2. The guiding member 3 can be provided with a first clearing slot 32 and a third threaded hole 33. The first clearing slot 32 can be in communication with the guiding slot 31. The guiding member 3 can be connected to the pivoting portion 9 via the third threaded holes 33. In some embodiments, two third threaded holes 33 can be provided which are respectively provided at two sides of the first clearing slot 32. It will be appreciated that, the number of the third threaded holes 33 can vary according to actual requirements. The guiding member 3 can comprise a restrainer 34. The tension spring 2 and the guiding member 3 can be restrained by the restrainer 34 and the base plate 4. In some embodiments, two restrainers 34 can be provided which are respectively provided at two sides of the guiding slot 31. It will be appreciated that, the number of the restrainers 34 can vary according to actual requirements.

The base plate 4 can be connected to the bottom casing 1 and the bearing plate 8. The base plate 4 can be sandwiched between the bottom casing 1 and bearing plate 8. The base plate 4 can comprise a first surface 41 which is to be connected to the bearing plate 8. The base plate 4 can be provided with a first receiving slot 42 which is provided along the first surface 41 and a surface of the base plate 4 perpendicular to the first surface 41. The arm 5 and a portion of the clamp 6 can be received in the first receiving slot 42. In some embodiments, two first receiving slots 42 can be provided, each of which being provided at opposite sides of the base plate 4. The first receiving slot 42 can comprise a first bottom surface 421 which is provided parallel to the first surface 41. The base plate 4 can comprise a second connecting post 43. The arm 5 can be rotatably connected with the base plate 4 by attaching the arm 5 to the second connecting post 43. The second connecting post 43 can be provided with a fourth threaded hole 431 through which the base plate 4 is connected to the bearing plate 8.

In some embodiments, two second connecting posts 43 can be provided which are respectively provided on a first bottom surface 421 of the two first receiving slots 42. It will be appreciated that, the number of the second connecting posts 43 can vary according to actual requirements. The base plate 4 can be provided with a fifth threaded hole 44 and a first through-hole 45. The fifth threaded hole 44 and the first through-hole 45 can penetrate through the first surface 41. In some embodiments, three fifth threaded holes 44 can be provided, and three first through-holes 45 can be provided. The base plate 4 can comprise a first screw 46, a second screw 47 and a stopper 48. The stopper 48 can be disposed on a surface of the base plate 4 opposite to the first surface 41. In some embodiments, three first screws 46 can be provided which pass through a respective one of the first through-holes 45 and is threadedly connected to a respective one of the second threaded hole 131 and the two first threaded holes 113 of the bottom casing 1. Three second screws 47 can be provided which pass through a respective one of the bearing plates 8 and is threadedly connected to a respective one of the fifth threaded holes 44, such that the bearing plate 8 is fixed to the base plate 4. In some embodiments, two stoppers 48 can be provided, each of which abuts against a respective one the two restrainers 34 to restrain a movement of the guiding member 3.

One end of the arm 5 can be rotatably connected to the base plate 4, and the other end of the arm 5 can be rotatably connected to the clamp 6. The arm 5 can comprise a second surface 51 and a third surface 52 opposite to the second surface 51. The arm 5 can be provided with a second clearing slot 53 which is provided along the third surface 52 for receiving a portion of the clamp 6. A first stepped hole 54 can be provided at one end of the arm 5, and a first shaft hole 55 can be provided on the other end of the arm 5. The second connecting post 43 can be partially received in the first stepped hole 54, such that a rotatable connection is formed between the arm 5 and the base plate 4. The first shaft hole 55 can be in communication with the second clearing slot 53. The arm 5 can comprise a connecting shaft 56 which is partially received in the first shaft hole 55. In some embodiments, the arm 5 can be rotatably connected to the clamp 6 via the connecting shaft 56. In some instances, two arms 5 can be provided. The arm 5 can be provided with a fixed length. It will be appreciated that, the arm 5 can be provided as a telescopic rod having an adjustable length to satisfy practical requirements.

The clamp 6 can be rotatably connected to the arm 5. In some instances, the clamp 6 can be provided to have a substantially U-shape. The clamp 6 can comprise a carrying stage 61 for carrying an object (now shown). The carrying stage 61 can be provided with a second receiving slot 62 for receiving a portion of the arm 5. In some instances, the clamp 6 can comprise a clamping plate 63 fixed at one end of the carrying stage 61. The clamping plate 63 can comprise a second side 631 intersecting the carrying stage 61. The clamping plate 63 can be provided with a holding slot 64 which is provided along the second side 631 for receiving a corner of the object. In some embodiments, two clamps 6 can be provided, each of which is roratably connected to a respective one of the two arms 5. The second side 631 and the surface of the carrying stage 61 carrying the object can be provided with an elastic layer. It will be appreciated that, the clamps 6 can be made of an elastic material.

The elastic member 7 can be disposed on the bearing plate 8 to provide an elastic contact between the object and the bearing plate 8 and to prevent the object from being scratched by the bearing plate 8. The first elastic member 7 can comprise a first elastic sheet 71 and a second elastic sheet 72. In some embodiments, the first elastic sheet 71 and the second elastic sheet 72 can be provided as two separate sheets. It will be appreciated that, the first elastic sheet 71 and the second elastic sheet 72 can be provided as one integral sheet.

The bearing plate 8 can be connected to the base plate 4. The bearing plate 8 can comprise a fourth surface 81. In some instances, the bearing plate 8 can be provided with a third receiving slot 82 and a fourth receiving slot 83 which are located respectively at an end of the bearing plate 8. The third receiving slot 82 can be provided along the fourth surface 81 for receiving a portion of the second elastic sheet 72. The fourth receiving slot 83 can be provided along the fourth surface 81 for receiving a portion of the first elastic sheet 71. In some instances, the bearing plate 8 can be provided with a second through-hole 84 for receiving a portion of the first screws 46 and a sixth threaded hole 85 for receiving a portion of the second screws 47. In some embodiments, three second through-holes 84 and three sixth threaded holes 85 can be provided. The three second through-holes 84 and the three sixth threaded holes 85 can each penetrate a bottom surface of the third receiving slot 82 and a bottom surface of the fourth receiving slot 83. In some instances, the bearing plate 8 can be provided with a first through-slot 86 penetrating the bottom surface of the fourth receiving slot 83. In some instances, the bearing plate 8 can comprise a damping member 87, a first gasket 88 and a third screw 89. The third screw 89 can be screwed into the fourth threaded hole 431 of the base plate 4 by passing through the first gasket 88, the damping member 87 and the first through-slot 86, such that the bearing plate 8 is fixedly connected to the base plate 4. In some embodiments, two first through-slots 86, two damping members 87, two first gaskets 88 and two third screw 89 can be provided.

The pivoting portion 9 can comprise a third side 91. The pivoting portion 9 can be provided with a fifth receiving slot 911 into the third side 91 for receiving a portion of the tension spring 2 and a portion of the guiding member 3. The pivoting portion 9 can be provided with a second stepped hole 92 which is in communication with the fifth receiving slot 911. In some instances, the pivoting portion 9 can comprise a first pin 94. In some embodiments, three first pins 94 and three second stepped holes 92 can be provided. One of the first pins 94 can pass through a corresponding one of the second stepped holes 92 and be received in the second connecting end 22 of the tension spring 2. through, The other two of the first pins 94 can respectively pass through the corresponding two second stepped holes 92 and be connected to the two third threaded holes 33 of the guiding member 3, such that the pivoting portion 9 is connected to the tension spring 2 and the guiding member 3.

A first pin hole 93 can be provide at a side of the pivoting portion 9 opposite to the side where the fifth receiving slot 911 is provided. In some instances, the pivoting portion 9 can comprise a second pin 95, a second gasket 96, a third gasket 97 and a third pin 98. The second pin 95 can pass through the second gasket 96 and be partially received in one end of the first pin hole 93, and the third pin 98 can pass through the third gasket 97 and be partially received in the other end of the first pin hole 93.

The tension spring 2 can pass through the guiding slot 31 of the guiding member 3. The first connecting end 21 of the tension spring 2 can be sleeved on the first connecting post 13 of the bottom casing 1. One of the three first pins 94 can pass through a corresponding one of the second stepped holes 92 and be received in the second connecting end 22 of the tension spring 2, such that the tension spring 2 is connected to the bottom casing 1 and the pivoting portion 9. The other two first pins 94 can respectively pass through two corresponding second stepped holes 92 and be threadedly connected to the two third threaded holes 33, such that the guiding member 3 is connected to the pivoting portion 9.

The first stepped hole 54 of the arm 5 can be sleeved on the second connecting post 43 of the base plate 4, such that the two arms 5 are respectively rotatably connected to the base plate 4. The end of the arm 5 where the first shaft hole 55 is provided can be received in the second receiving slot 62 of the clamp 6, and the arm 5 can be rotatably connected to the clamp 6 through the connecting shaft 56. Each of the three first screws 46 can pass through the a corresponding one of the second through-holes 84 of the bearing plate 8 and a corresponding one of the first through-holes 45 of the base plate 4 and be threadedly connected to a corresponding one of the second threaded hole 131 and the two first threaded holes 113 of the bottom casing 1, such that the base plate 4 is fixed to the bottom casing 1. Each of the two third screws 89 can pass through a corresponding one of the two first gaskets 88, a corresponding one of the two damping members 87 and a corresponding one of the two first through-slots 86 of the bearing plate 8 and be threadedly connected to a corresponding one of the two fourth threaded holes 431 of the base plate 4. Each of the three second screws 47 can pass through a corresponding one of the three sixth threaded holes 85 of the bearing plate 8 and be threadedly connected to a corresponding one of the three fifth threaded holes 44 of the base plate 4, such that the bearing plate 8 is fixed to the base plate 4. The first elastic sheet 71 of the first elastic member 7 can be disposed within the fourth receiving slot 83, and the second elastic sheet 72 can be disposed within the third receiving slot 82. The first elastic sheet 71 and the second elastic sheet 72 can protrude from the fourth surface 81.

The second clamping member 10b can comprise a connecting portion 301, a connecting body 306 and a second elastic member 307. The connecting portion 301 can be rotatably connected to the pivoting portion 9. The connecting portion 301 can comprise a connecting surface 3011. The connecting portion 301 can be provided with a connecting slot 3012 into the connecting surface 3011 and a surface of the connecting portion 301 perpendicular to the connecting surface 3011 for receiving a portion of the pivoting portion 9. The connecting portion 301 can be provided with a first connecting hole 3013 and a second connecting hole 3014. A central axes of the first connecting hole 3013 can substantially coincide with a central axis of the second connecting hole 3014. In some embodiments, the first connecting hole 3013 and the second connecting hole 3014 can both be in communication with the connecting slot 3012.

In some instances, the connecting portion 301 can be provided with a first holding slot 3015 along the connecting surface 3011. In some embodiments, a portion of the second elastic member 307 can be received in the first holding slot 3015. In some embodiments, two first holding slots 3015 can be provided spacing apart from each other. In some instances, the connecting portion 301 can be provided with a receiving portion 3016. The receiving portion 3016 can be provided between the two first holding slots 3015 for receiving a part of a connecting member 302.

The connecting body 306 can be used to clamp the object together with the two clamps 6. The connecting body 306 can comprise a fixing surface 3061. The connecting body 306 can be provided with a fitting hole 3062 penetrating the fixing surface 3061 for receiving a portion of a threaded shaft 3022 of the connecting member 302. The connecting body 306 can be provided with a third holding slot 3063 along the fixing surface 3061 for receiving a portion of the second elastic member 307.

The second pin 95 can pass through the second gasket 96 and the second connecting hole 3014 and be screwed into one end of the first pin hole 93 of the pivoting portion 9, meanwhile, the third pin 98 can pass through the third gasket 97 and the first connecting hole 3013 and be screwed into the other end of the first pin hole 93 of the pivoting portion 9, such that the pivoting portion 9 is rotatably connect to the connecting portion 301. The first clamping member 10a can rotate about the central axis of the second connecting hole 3014 of the second clamping member 10b. The pivoting portion 9 can be partially received within the connecting slot 3012 of the connecting portion 301.

The adaptor 30 can be rotatably connected to a bearing member (not shown). The adaptor 30 can and comprise the connecting member 302, a nut 303, a retaining ring 304, a bearing body 308 and a chuck 309. The adaptor 30 can be connected to the bearing member through the connecting member 302. The connecting member 302 can be connected with the bearing member by a thread fit or a snap fit.

The connecting member 302 can be threadedly connected to the bearing member. The connecting member 302 can comprise a knob 3021 and the threaded shaft 3022 connected to the knob 3021. The knob 3021 can be provided with a second holding slot 3023 for receiving a portion of the nut 303. One end of the threaded shaft 3022 can be fixed on the bottom surface of the second holding slot 3023. The other end of the threaded shaft 3022 can pass through the nut 303, the retaining ring 304, the damping member 305, the connecting body 306, the bearing body 308 and the chuck 309 and be threadedly connected to the bearing member. In some embodiments, the damping member 305 can be a damping ring. It will be appreciated that, the damping member 305 can be provided as various types of damping element.

The retaining ring 304 can be provided between the nut 303 and the damping member 305 for preventing a loosening of the nut 303 from. The retaining ring 304 can be provided with an ring hole 3041. In some instances, the ring hole 3041 can be a non-circular hole. The damping member 305 can provide a rotational resistance when the holding portion 10 rotates with respect to the adaptor 30. The holding portion 10 can be retained at an attitude relative to the adaptor 30 by the rotational resistance if an external force rotating the holding portion 10 is removed. In some embodiments, two damping members 305 can be provided, each of which being provided at respective side of the connecting body 306. One of the damping members 305 can abut against the connecting body 306 and the bearing body 308, and the other one the damping members 305 can be disposed between the retaining ring 304 and the connecting body 306 and abut against the connecting body 306. It will be appreciated that, the number of the damping members 305 can vary according to actual requirements.

The bearing body 308 can pass through one of the damping members 305 and be connected to the connecting body 306. The bearing body 308 can comprise a body 3081 and a plain shaft 3082 connected to the body 3081. The plain shaft 3082 can be provided non-cylindrical. The plain shaft 3082 can comprise a fitting surface 3083 which mates to the ring hole 3041 to restrain a rotation of the retaining ring 304 about the plain shaft 3082.

In some embodiments, the fitting surface 3083 can be planar. Two fitting surfaces can be provided opposite to each other. The bearing body 308 can be provided with a third through-hole 3084. The third through-hole 3084 can be provided penetrating the body 3081 and the plain shaft 3082. The threaded shaft 3022 of the connecting member 302 can pass through the third through-hole 3084. In some instances, the bearing body 308 can be provided with a fourth holding slot 3085. The plain shaft 3082 can be fixed on a bottom surface of the fourth holding slot 3085.

The chuck 309 can be fixed to the bearing body 308 and be provided with an aperture 3091. The threaded shaft 3022 of the connecting member 302 can pass through the aperture 3091. In some instances, the chuck 309 can comprise a tightening portion 3092 connected to the bearing member. In some embodiments, the tightening portion 3092 can comprise a plurality of teeth (not shown) provided on one end face of the chuck 309 along a circumference of the chuck 309. It will be appreciated that, the tightening portion 3092 can be provided with other structures. For example, the tightening portion 3092 can comprise a plurality of protrusions spaced apart from each other.

In assembling the clamping mechanism, the chuck 309 can be fixed to the bearing body 308. The plain shaft 3082 of the bearing body 308 can pass through one of the damping members 305, the connecting body 306, the other one of the damping members 305, the retaining ring 304 and the nut 303 in this order, such that the plain shaft 3082 is connected to the two damping members 305, the connecting body 306, the retaining ring 304 and the nut 303. The threaded shaft 3022 of the connecting member 302 can pass through the third through-hole 3084 of the bearing body 308 and be threadedly connected to the bearing member. The nut 303 can be partially received in the second holding slot 3023 of the connecting member 302 while a threaded connection is not formed between the connecting member 302 and the nut 303. The retaining ring 304 can abut against one side of the connecting body 306 with one of the damping members 305 being sandwiched therebetween. The bearing body 308 can abut the other one of the damping members 305 against the other side of the connecting body 306. The two fitting surfaces 3083 can be matched with the ring hole 3041 to limit a rotation of the retaining ring 304 about the plain shaft 3082, thereby preventing the nut 303 from loosening.

The connecting portion 301 can be fixed to the connecting body 306. The knob 3021 of the connecting member 302 can be partially received in the receiving portion 3016 of the connecting portion 301. The second elastic member 307 can be partially received in the two first holding slots 3015 and the third holding slot 3063. The second elastic member 307 can be connected to the connecting portion 301 and the connecting body 306. A central axis of the plain shaft 3082 can be perpendicular to a central axis of the second connecting hole 3014. It will be appreciated that, in some other embodiments, the damping members 305 can be disposed on the holding portion 10.

Figure 4:
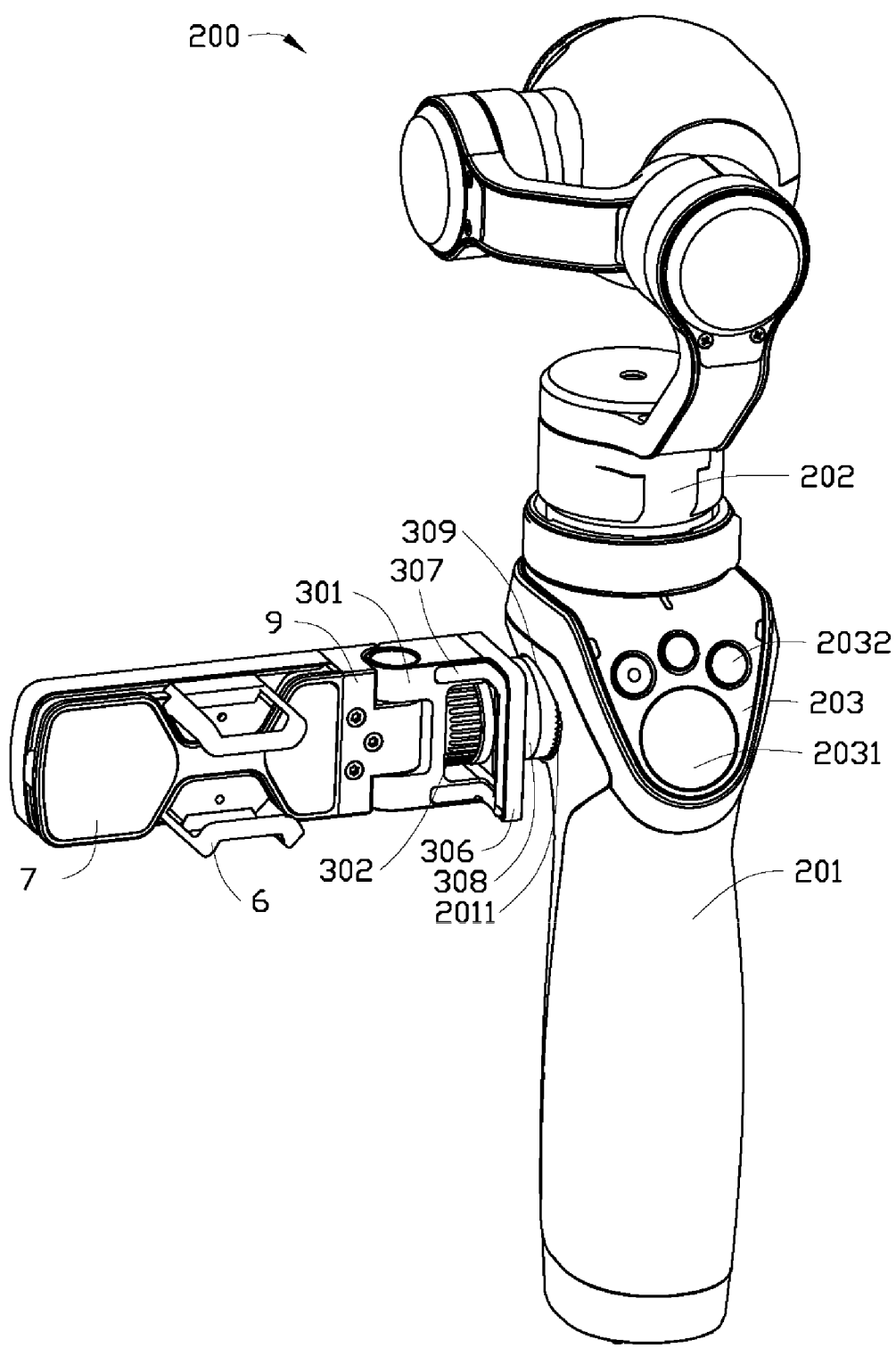
FIG. 4 shows a structure of a gimbal according to a second embodiment of the disclosure.

FIG. 4 shows a gimbal 200 according to a second embodiment of the disclosure. The gimbal 200 can comprise a main body 201 and the clamping mechanism 100 as discussed hereinabove. The clamping mechanism 100 can be connected to the main body 201. The main body 201 can be the bearing member as discussed hereinabove. The threaded shaft 3022 of the connecting member 302 of the clamping mechanism 100 can be threadedly connected to the main body 201. The main body 201 can comprise an engaging portion 2011 abutting against the tightening portion 3092 of the chuck 309 of the clamping mechanism 100, such that the chuck 309 can be connected to the main body 201. In some embodiments, the engaging portion 2011 can be a teethed plate.

Figure 5:
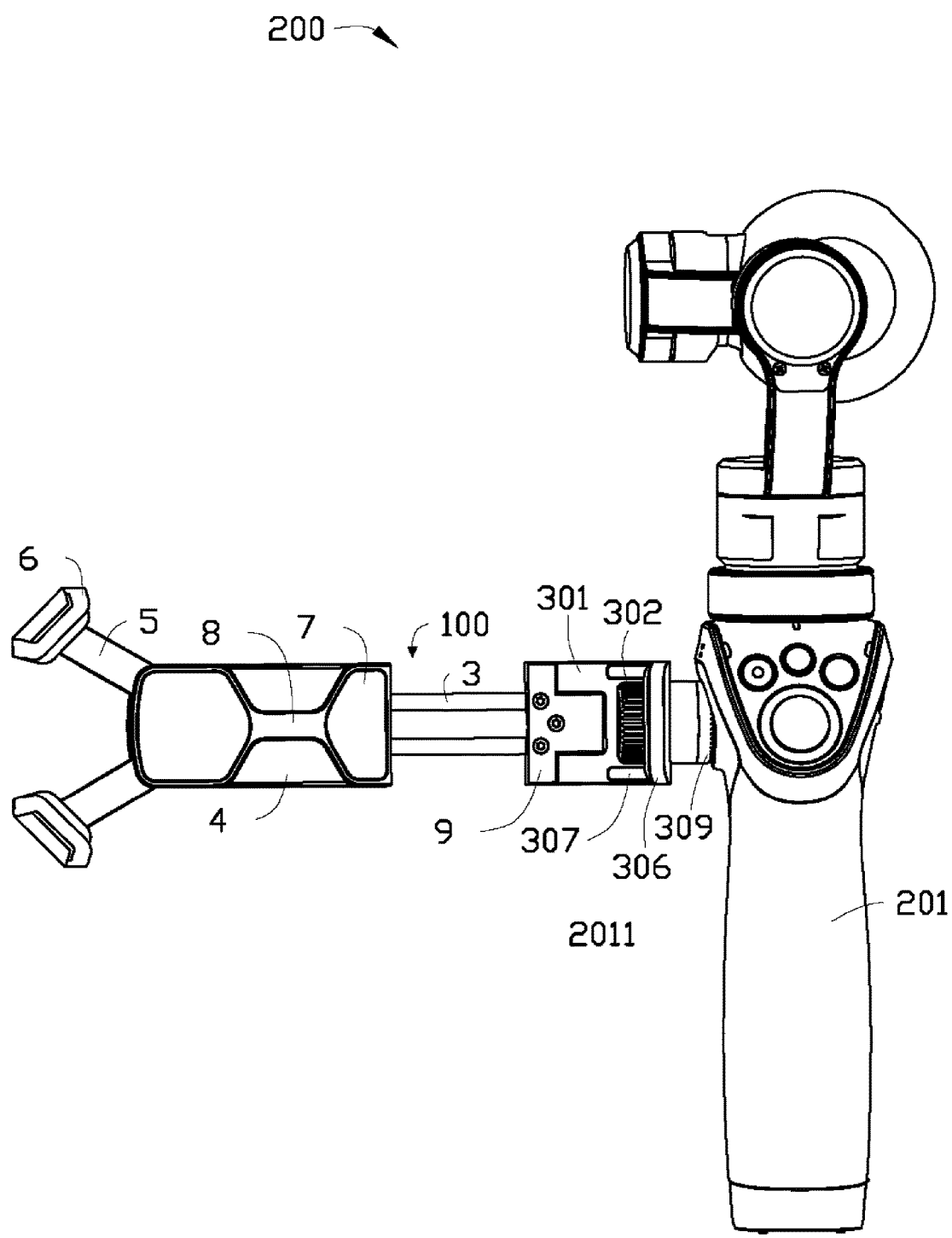
FIG. 5 shows a clamping mechanism of the gimbal of FIG. 4 when it is in use.

Referring to FIG. 5, when an object (not shown) is clamped by the gimbal 200, a first end of the object can abut against the second elastic member 307 of the clamping mechanism 100. The holding portion 10 can be pulled to adjust a distance between the second elastic member 307 and the clamps 6 based upon a length of the object between the first end of the object abutting against the second elastic member 307 and a second end of the object opposite to the first end. The tension spring 2 can be elastically deformed. The bottom casing 1, the tension spring 2, the base plate 4, the arms 5, the clamps 6, the first elastic member 7 and the bearing plate 8 can be moved away from the second elastic member 307 along a length direction of the guiding slot 31 of the guiding member 3. Meanwhile, each of the two clamps 6 can be rotated about a respective second connecting post 43 of the base plate 4, such that the object is clamped by the two clamps 6 and the second elastic member 307. Two adjacent corners of the object can be respectively received in the holding slots 64 of the two clamps 6, such that the object is prevented from releasing from the clamping mechanism 100 due to a shock.

In changing an attitude of the object, an external force can be applied to the clamping mechanism 100 to overcome a rotational resistance of the holding portion 10 to rotate the clamping mechanism 100. The rotational resistance can be provided by the two damping members 305 when the holding portion 10 rotates relative to the main body 201 about the plain shaft 3082 of the bearing body 308, The holding portion 10 can be rotated into a desired attitude with respect to the adaptor 30. The clamping mechanism 100 can be retained in a locked state when the object is rotated to a desired attitude and the external force is removed. In this locked state, the holding portion 10 can be retained at the desired attitude with respect to the main body 201 by the rotational resistance.

The holding portion 10 can be pulled in a direction away from the main body 201 (e.g, the holding portion 10 being away from the main body 201) to remove the object from the clamping mechanism 100. The object can thus be removed from the clamping mechanism 100. The holding portion 10 can return to an original position by an elastic force of the tension spring 2.

Figure 6:
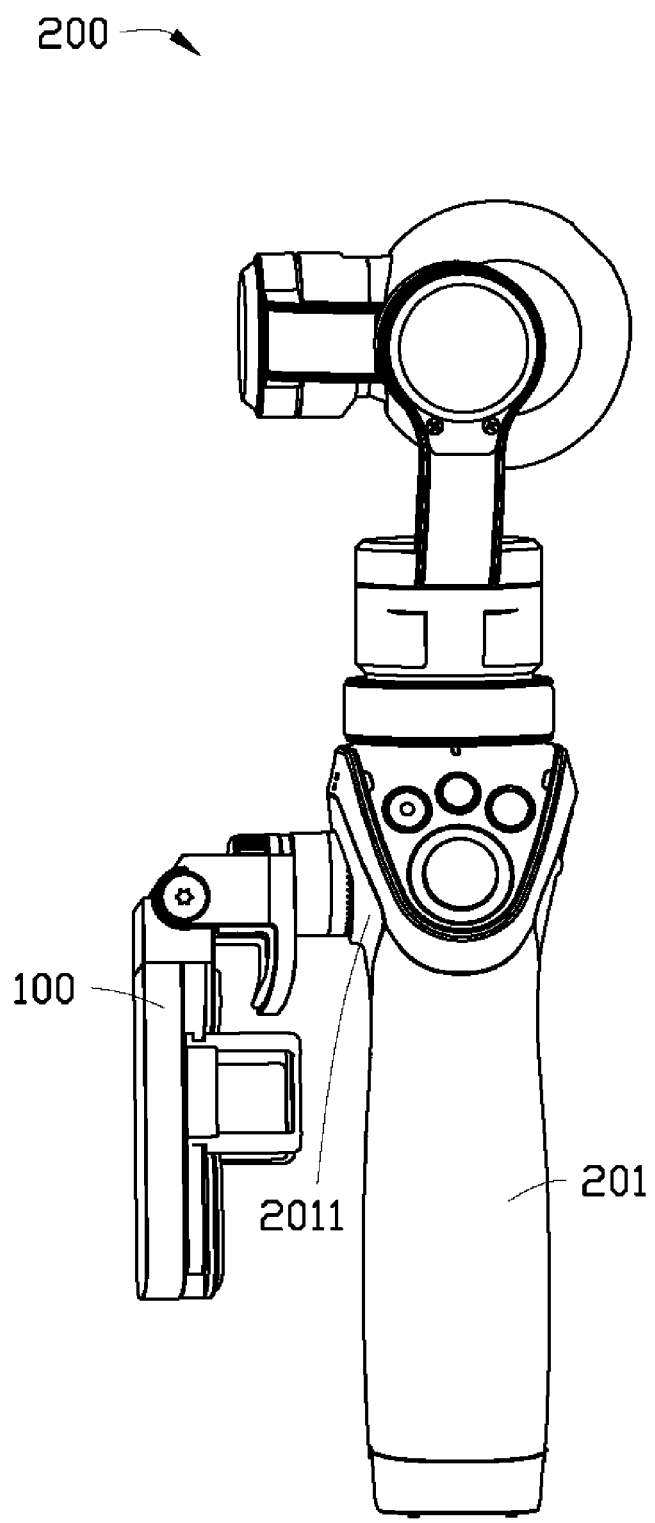
FIG. 6 shows the clamping mechanism of the gimbal of FIG. 4 when it is not in use.

Referring to FIG. 6, when the gimbal 200 is not in use, each of the two clamps 6 can be rotated toward the bottom casing 1 about a respective second connecting post 43 of the base plate 4, such that the two clamps 6 and the two arms 5 can respectively be partially received in the two first receiving slots 42 of the bottom casing 1. The holding portion 10 can be rotated toward the main body 201 with respect to the adaptor 30 to bring the holding portion 10 close to the main body 201. The main body 201 can face the holding portion 10 to facilitate a storage of the gimbal 200.

Figure 7:
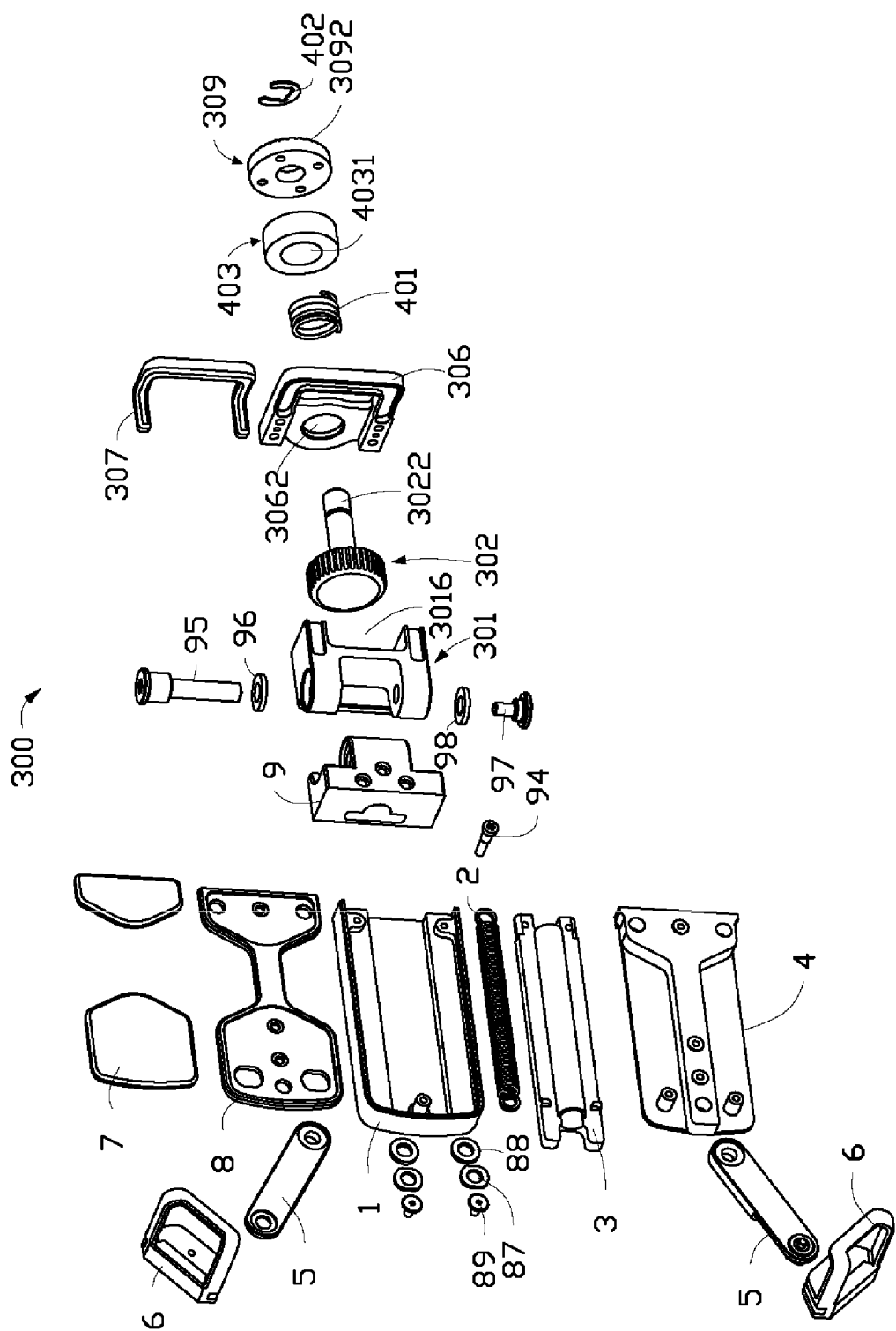
FIG. 7 is an exploded view of a clamping mechanism according to a third embodiment of the disclosure.
Figure 8:
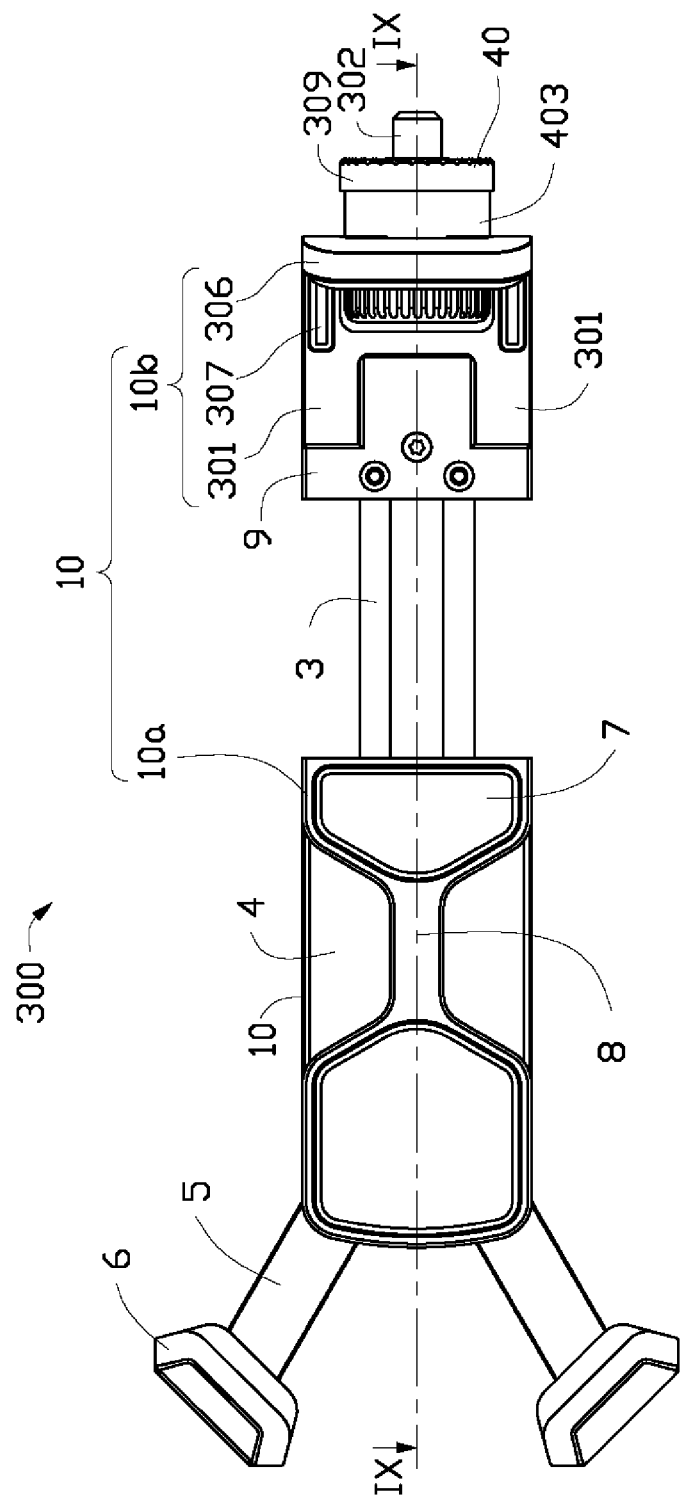
FIG. 8 is a top view of the clamping mechanism in FIG. 7.
Figure 9:
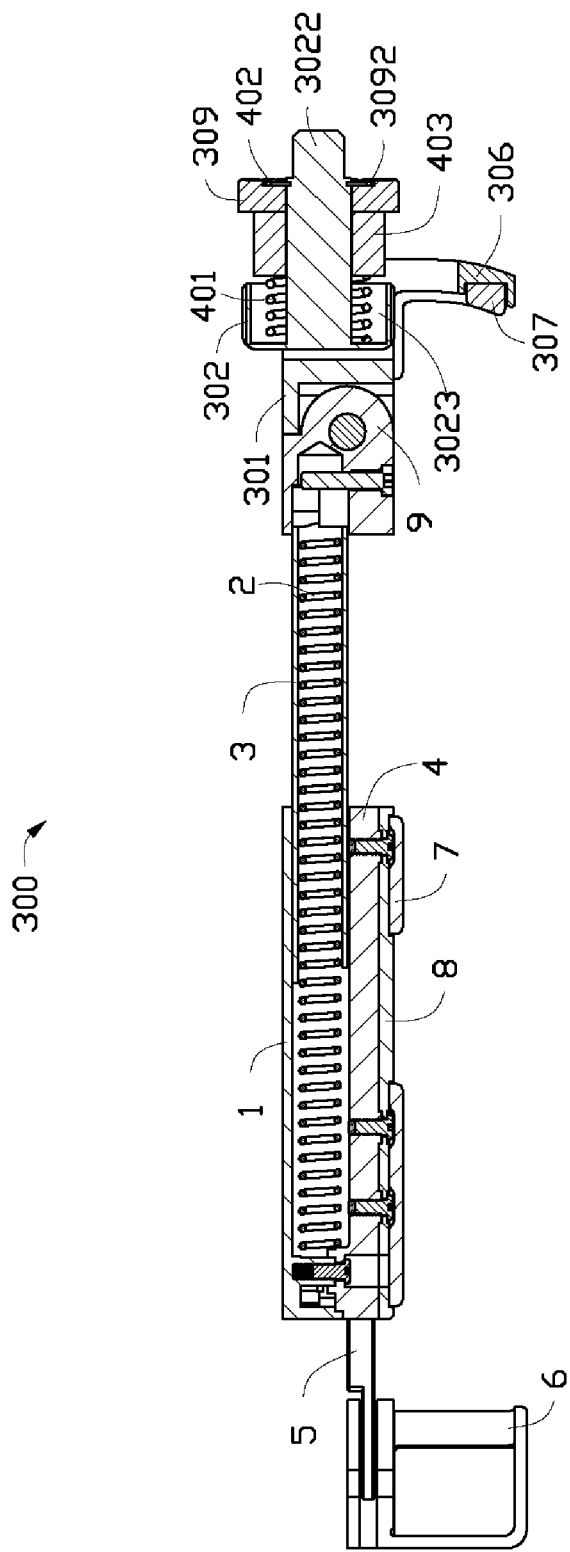
FIG. 9 is a cross-sectional view of the clamping mechanism in FIG. 8, taken along an IX-IX line.

FIGS. 7 to 9 show a clamping mechanism 300 according to a third embodiment of the disclosure. The clamping mechanism 300 can be substantially identical to the clamping mechanism 100 of the first embodiment of the disclosure. The two damping members 305 can be omitted from the clamping mechanism 300, and the nut 303, the retaining ring 304 and the bearing body 308 can be omitted from an adaptor 40 of the clamping mechanism 300. In some instances, the adaptor 40 can comprise an elastic body 401, a snap ring 402 and an abutting member 403. The abutting member 403 can be provided with a receiving hole 4031.

The holding portion 10 can be connected to the adaptor 40. The elastic body 401 can be sleeved on the threaded shaft 3022 of the connecting member 302. The threaded shaft 3022 of the connecting member 302 can pass through the fitting hole 3062 of the connecting body 306, the receiving hole 4031 of the abutting member 403 and the aperture 3091 of the chuck 309. One end of the elastic body 401 can be connected to a bottom surface of the second holding slot 3023 of the connecting member 302, and the other end of the elastic body 401 can be connected to a surface of the abutting member 403 facing the connecting body 306. The snap ring 402 can be disposed on the threaded shaft 3022. The chuck 309 can abut against the snap ring 402. The snap ring 402 can prevent a movement of the chuck 309 in an axial direction of the threaded shaft 3022. The connecting portion 301 can be fixed to the connecting body 306. The connecting member 302 can be partially received in the receiving portion 3016 of the connecting portion 301. The second elastic member 307 can be connected to the connecting portion 301 and the connecting body 306.

Figure 10:
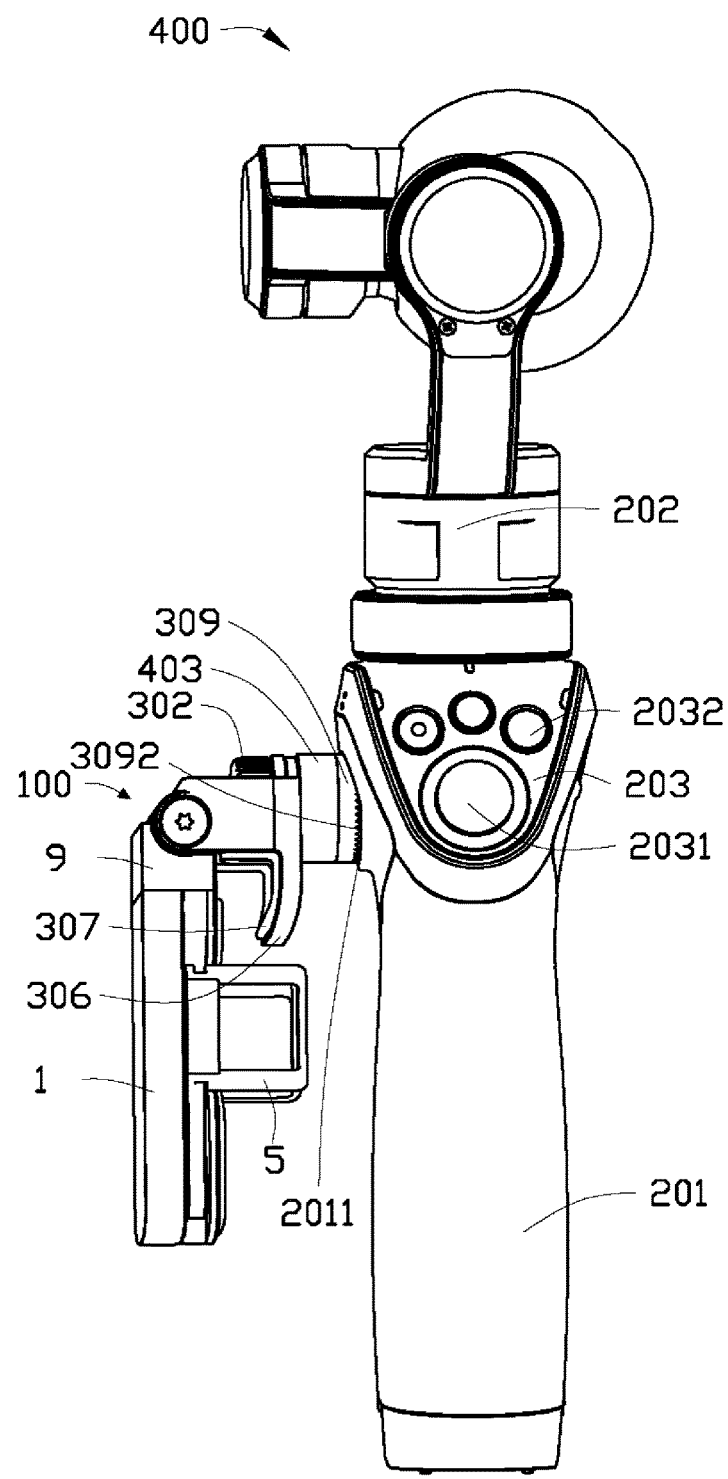
FIG. 10 shows a structure of a gimbal according to a fourth embodiment of the disclosure.

FIG. 10 shows a gimbal 400 according to a fourth embodiment of the disclosure. The gimbal 400 can be substantially identical to the gimbal 200 of the second embodiment of the disclosure. The clamping mechanism 100 can be omitted from the gimbal 400. In some instances, the gimbal can comprise the clamping mechanism 300. The threaded shaft 3022 of the connecting member 302 of the clamping mechanism 300 can be threadedly connected to the main body 201. The chuck 309 can be connected to the main body 201 to prevent the adaptor 40 from loosening from the main body 201. The engaging portion 2011 of the main body 201 of the gimbal 400 can abut against or release from the tightening portion 3092 of the chuck 309 of the clamping mechanism 300. Therefore, the clamping mechanism 300 can be switched from a locked state to a rotatable state to effect a rotation of the clamping mechanism 300 and a locking of the clamping mechanism 300 at any locking position.

The elastic body 401 can be elastically deformed by an external force to change an attitude of an object clamped by the clamping mechanism 300. The chuck 309 can be movable and can be slided in a direction away from the main body 201, such that the chuck 309 is detached from the main body 201. The clamping mechanism 300 can be rotatable and can be rotated by any angle with respect to the main body 201. When the external force is removed after the object has been rotated to a desired angle, The elastic body 401 can restore and the chuck 309 can return to an original position through the abutting member 403 by an elastic force of the elastic body 401. The chuck 309 can be in a locked state where the tightening portion 3092 of the chuck 309 abuts against the engaging portion 2011 of the main body 201. In this locked state, the clamping mechanism 300 can be retained at a desired attitude relative to the main body 201.

In some embodiments, The gimbal can comprise an actuator 202. The actuator 202 can carry an imaging device such as a camera or a video camera. The actuator 202 can be rotatably connected to the main body 201. In some instances, the gimbal can comprise a control system 203 provided to the main body 201. The control system 203 can comprise a mode button 2031 and a rotation button 2032. The mode button 2031 can be provided to control a mode of the actuator 202 of the gimbal, such as an operating mode or a non-operating mode. When the actuator 202 is in the operating mode, the rotation button 2032 can control the actuator 202 to drive the imaging device to rotate a predetermined angle with respect to the main body 201. In some embodiments, the predetermined angle can be 660°.

With the clamping mechanism and the gimbal having the clamping mechanism of the disclosure, the holding portion can be roratably connected to the adaptor to adjust an attitude of the holding portion with respect to the adaptor. In some instances, the clamping mechanism can comprise a damping member provided between the holding portion and the adaptor. The damping member can provide a rotational resistance when the holding portion rotates relative to the adaptor. The holding portion can be retained at a desire attitude with respect to the adaptor by the rotational resistance when an external force rotating the holding portion is removed. An attitude of an object clamped by the clamping mechanism can be varied by simply rotating the clamping mechanism. A manipulation of the clamping mechanism can be made easy.

It will be appreciated that, numerous variations and substitutions will occur to those skilled in the art without departing from the scope of the disclosure. Those variations and substitutions made in accordance with the spirit of the disclosure are within the scope of the present disclosure.

What is claimed is:

1. A gimbal comprising:
    a main body; and
    a clamping mechanism rotatably connected to the main body, the clamping mechanism comprising:
        an adaptor connecting the clamping mechanism to the main body, the adaptor comprising a connecting member connecting the adaptor to the main body;
        a holding portion rotatably connected to the adaptor; and
        one or more damping members disposed between the holding portion and the adaptor, and configured to provide a resistance to a rotation of the holding portion with respect to the adaptor.

2. The gimbal of claim 1, wherein the clamping mechanism is configured to overcome the resistance provided by the one or more damping members to rotate the holding portion with respect to the adaptor in a rotating state.

3. The gimbal of claim 2, wherein the one or more damping members are configured to maintain an attitude of the holding portion with respect to the adaptor by the resistance when the clamping mechanism is in a locked state.

4. The gimbal of claim 1, wherein the holding portion comprises:
   a first clamping member; and
   a second clamping member rotatably connected to the first clamping member and connected to the adaptor.

5. The gimbal of claim 4, wherein the first clamping member comprises:
   a bottom casing;
   a pivoting portion connected to the bottom casing; and
   a guiding member connected to the bottom casing and configured to guide a movement of the bottom casing relative to the pivoting portion.

6. The gimbal of claim 5, wherein:
   the guiding member comprises a guiding slot, and
   the first clamping member further comprises a tension spring, one end of the tension spring being connected to the bottom casing, and another end of the tension spring passing through the guiding slot and being connected to the pivoting portion.

7. The gimbal of claim 6, wherein the first clamping member further comprises:
   a base plate fixed to the bottom casing; and
   a clamp rotatably connected to the base plate and configured to clamp an object.

8. The gimbal of claim 6, wherein the first clamping member further comprises an arm, one end of the arm being rotatably connected to the clamps, and another end of the arm being rotatably connected to the base plate.

9. The gimbal of claim 6, wherein the clamp comprises a holding slot for partially receiving a corner of the object when the object is clamped by the clamp.

10. The gimbal of claim 6, wherein the clamping mechanism further comprises:
    a bearing plate fixed to the base plate; and
    a first elastic member disposed on the bearing plate and configured to provide an elastic contact between the object and the bearing plate.

11. The gimbal of claim 6, wherein:
    the guiding member comprises a restrainer,
    the base plate comprises a stopper, and
    the restrainer is configured to abut against the stopper to restrain a movement of the guiding member.

12. The gimbal of claim 4, wherein:
    the second clamping member comprises a connecting body,
    the adaptor comprises a chuck fixed to a bearing body and connected to the main body, and
    the connecting member passes through the one or more damping members, the connecting body, and the chuck.

13. The gimbal of claim 12, wherein the one or more damping members comprise two damping members, one of the two damping members being disposed between the connecting body and the bearing body and abutting against one side of the connecting body and the bearing body, and another one of the two damping members abutting against another side of the connecting body.

14. The gimbal of claim 12, wherein the chuck comprises a tightening portion connected to the main body.

15. The gimbal of claim 14, wherein the tightening portion comprises a plurality of teeth on one end face of the chuck along a circumference of the chuck.

16. The gimbal of claim 12, wherein the second clamping member further comprises:
    a connecting portion fixed to the connecting body; and
    a second elastic member disposed on the connecting portion and the connecting body for clamping an object.

17. The gimbal of claim 12, wherein:
    the adaptor further comprises a retaining ring and a nut,
    the connecting member passes through the nut and the retaining ring, and
    the retaining ring is located between the nut and the connecting body for preventing the nut from loosening.

18. The gimbal of claim 17, wherein:
    the retaining ring comprises a ring hole, and
    the bearing body comprises:
    a body; and
    a plain shaft connected to the body and comprising a fitting surface, the plain shaft passing through the one or more damping members, the connecting body, the retaining ring, and the nut in this order, and the fitting surface mating with the ring hole to restrain a rotation of the retaining ring about the plain shaft.

19. The gimbal of claim 18, wherein the connecting member comprises a threaded shaft, the threaded shaft passing through the plain shaft and the body and being partially received in the chuck.

20. The gimbal of claim 1, further comprising:
    an actuator rotatably connected to the main body for carrying an imaging device; and
    a control system arranged at the main body, the control system comprising:
    a mode button configured to control a mode of the actuator to switch between an operating mode and a non-operating mode; and
    a rotation button configured to control the actuator to drive the imaging device to rotate by a predetermined angle with respect to the main body when the actuator is in the operating mode.

* * * * *